US011977506B2

(12) United States Patent
Heckroth et al.

(10) Patent No.: US 11,977,506 B2
(45) Date of Patent: May 7, 2024

(54) ENUMERATION OF PERIPHERAL DEVICES ON A SERIAL COMMUNICATION BUS

(71) Applicant: Skyworks Solutions, Inc., Irvine, CA (US)

(72) Inventors: James E. Heckroth, Austin, TX (US); Patrick Johannus De Bakker, Hollis, NH (US); Ion Constantin Tesu, Austin, TX (US); Phillip M. Matthews, Driftwood, TX (US)

(73) Assignee: Skyworks Solutions, Inc., Irvine, CA (US)

(*) Notice: Subject to any disclaimer, the term of this patent is extended or adjusted under 35 U.S.C. 154(b) by 46 days.

(21) Appl. No.: 17/546,581

(22) Filed: Dec. 9, 2021

(65) Prior Publication Data

US 2022/0188257 A1 Jun. 16, 2022

Related U.S. Application Data

(60) Provisional application No. 63/124,381, filed on Dec. 11, 2020.

(51) Int. Cl.
*G06F 13/40* (2006.01)
*G06F 13/42* (2006.01)

(52) U.S. Cl.
CPC ...... *G06F 13/4068* (2013.01); *G06F 13/4004* (2013.01); *G06F 13/4282* (2013.01); *G06F 13/4291* (2013.01)

(58) Field of Classification Search
None
See application file for complete search history.

(56) References Cited

U.S. PATENT DOCUMENTS

| 6,212,457 | B1 | 4/2001 | Miciuda et al. |
| 8,571,738 | B1 | 10/2013 | Potter et al. |
| 9,213,396 | B1 | 12/2015 | Booth et al. |
| 9,531,376 | B2 | 12/2016 | Sonntag et al. |
| 10,055,376 | B1 * | 8/2018 | Newkirk ............ G06F 13/4068 |
| 10,120,829 | B2 | 11/2018 | Cox et al. |
| 10,587,268 | B2 | 3/2020 | Li et al. |
| 2002/0188781 | A1 | 12/2002 | Schoch et al. |
| 2008/0186796 | A1 | 8/2008 | Takano |
| 2009/0031048 | A1 | 1/2009 | Richards et al. |

(Continued)

FOREIGN PATENT DOCUMENTS

| JP | 57-182820 A | 11/1982 |
| JP | 06-230863 A | 8/1994 |

(Continued)

OTHER PUBLICATIONS

U.S. Appl. No. 17/546,588, filed Dec. 9, 2021, entitled Auto-Enumeration of Peripheral Devices on a Serial Communication Bus, inventors James E. Heckroth et al.

(Continued)

*Primary Examiner* — Farley Abad
*Assistant Examiner* — Dayton Lewis-Taylor
(74) *Attorney, Agent, or Firm* — Knobbe, Martens, Olson & Bear, LLP

(57) ABSTRACT

A controller enumerates a plurality of devices while operating in a daisy-chain mode of operation and then causes the devices to operate in a parallel mode of operation in which the devices are individually addressed.

25 Claims, 16 Drawing Sheets

(56) References Cited

U.S. PATENT DOCUMENTS

| | | | |
|---|---|---|---|
| 2010/0185784 A1 | 7/2010 | De Nie et al. | |
| 2011/0289248 A1* | 11/2011 | Djabbari | G06F 13/4256 710/110 |
| 2016/0170930 A1* | 6/2016 | Weng | G06F 1/26 710/110 |
| 2021/0124696 A1 | 4/2021 | Aichriedler et al. | |
| 2022/0182004 A1 | 6/2022 | Heckroth et al. | |
| 2022/0188262 A1 | 6/2022 | Heckroth et al. | |

FOREIGN PATENT DOCUMENTS

| | | |
|---|---|---|
| JP | 07-160435 A | 6/1995 |
| WO | WO 2022/125768 | 6/2022 |

OTHER PUBLICATIONS

International Search Report dated Mar. 28, 2022 for Application No. PCT/US2021/062595, 10 pages.

\* cited by examiner

ENUMERATION OF PERIPHERAL DEVICES ON A SERIAL COMMUNICATION BUS

CROSS-REFERENCE TO RELATED APPLICATION(S)

This application claims benefit of provisional application 63/124,381 filed Dec. 11, 2020, entitled "ENUMERATION OF PERIPHERAL DEVICES ON A SERIAL COMMUNICATION BUS", naming as inventors James E. Heckroth et al., which application is incorporated herein by reference.

This application is related to the application entitled "AUTO-ENUMERATION OF PERIPHERAL DEVICES ON A SERIAL COMMUNICATION BUS" naming James E. Heckroth et al., as inventors, filed the same day as the present application, application Ser. No. 17/546,588, which application is incorporated herein by reference.

BACKGROUND

Field of the Invention

This application relates to identification of devices on a serial communication bus.

Description of the Related Art

A host controller often needs to communicate with multiple peripheral devices on a shared serial communications bus. In order to do this, some method of selecting, or "addressing" individual peripheral devices is required. One traditional approach is to provide an individual "chip-select" pin from the controller to each peripheral device. The downside of this approach is the number of pins required on the host controller when there are a large number of peripheral devices to be addressed.

FIG. 1 provides a block diagram illustrating a traditional serial communication arrangement using individual chip selects for each peripheral device. The clock output signal from the controller 102 is routed to the CLK input pins of all of the peripheral devices 104, 106, and 108 in parallel. The "Controller-Out, Peripheral-In" (COPI) serial data output from the controller 102 is connected to all of the peripheral device "Shift Data In" (SDI) inputs in parallel. The "Shift Data Out" (SDO) serial data outputs from the peripheral devices are connected together and routed to the "Controller-In, Peripheral-Out" (CIPO) serial data input of the controller. Individual active-low "Chip Select" outputs from the host, labelled CS1_b through CSn_b, are routed to the active-low Chip Select input pin, CS_b, on each peripheral device, where the "b" indicates an active low signal. FIG. 1 also illustrates an example command structure 110 for a serial bus. The command structure includes a Command followed by an address. The example shown in FIG. 1 shows a Read Register command followed by a register address and a Write Register Command followed by a register address.

FIG. 2 depicts a single Write cycle, and a single Read Cycle, using the traditional arrangement with individual peripheral device chip selects. In this case, the host controller asserts only one of the chip select outputs to select which peripheral device is being addressed. The "Command" issued by the host on the COPI output indicates whether the cycle is a "Write" or a "Read" and specifies the register address to be written to or read from, as depicted in FIG. 2. The "word length" used for commands and data are implementation-specific with common lengths being 8 or 16 bits. The data transmission "DATA" follows the "Command Word". In the "Read" case, only the device addressed by the chip select is allowed to output data on its SDO pin.

FIG. 3 depicts a sequence of multiple read cycles from multiple devices using the traditional arrangement with individual peripheral device chip selects. This sequence depicts three reads to each of three peripheral devices to illustrate how successive reads to the same device can be cascaded. Note that a read command issued to one peripheral device cannot be followed immediately by a read command issued to a different peripheral device, as the chip select must be asserted to the first peripheral to allow the requested data to be returned. In the illustrated sequence, three read commands to the same device are followed by an unnamed command ("-"). The fourth unnamed command cannot be a command (e.g. read or write command) that requires a subsequent data transmission without adding another chip select cycle, but could be any "self-contained" command to the addressed device.

Another common approach is to use a "daisy-chaining" arrangement in which data from the host is shifted through multiple peripheral devices in series using a common chip select signal. In this case, the peripheral device effectively takes on an address that is the device's position in the daisy-chain. This arrangement has the disadvantage of high "clock-cycle overhead" required when addressing a single peripheral in isolation. FIG. 4 provides a block diagram illustrating a traditional serial communication "daisy-chain" arrangement. The clock output signal from the controller 402 is routed from the controller CLK output pin to the CLK input pins of all of the peripheral devices 404, 406, and 408 in parallel. A single chip select output from the host controller is routed from the controller CS_b pin to all of the peripheral device chip select inputs in parallel. The COPI serial data output from the controller is connected only to the SDI input of the first peripheral device 404 in the chain. The SDO output of the first peripheral device 404 is then connected to the SDI input of the second peripheral device 406 in the chain, and this continues such that the SDO output from the second-last peripheral is connected to the SDI input of the last peripheral device 408 in the chain. The SDO output from the last peripheral device 408 in the chain is returned to the CIPO input of the controller 402.

The input shift registers 410, 412, and 414 of the peripheral devices are thus connected in series as depicted in FIG. 4, effectively creating an extended shift register whose length is the serial communication protocol word length times the number of devices in the chain. For example, if a 16-bit word length is used with a daisy-chain of length n devices, the effective shift register word length would be 16×n. The controller sends commands to peripheral devices 1 through n by shifting out the commands end-to-end as a continuous 16×n-bit stream, with the command intended for peripheral device n shifted out first. At the end of the 16×n-bit transfer, the shift registers of each device contains the command intended for that device. In this way, addressing of individual devices is determined by their position in the chain.

FIG. 5 depicts the sequencing of three reads from each of the peripherals in a daisy-chain of length n=3 to illustrate the process. Three read commands, one for each peripheral, are shifted out from the controller COPI pin during the first activation 501 of CS_b. At the end of this period the internal shift registers of the peripheral devices are loaded with the requested data to be returned to the controller. During the next CS_b cycle 503, the "x" register data is shifted out of the cascaded peripheral device SDO pins, returning to the controller CIPO input. As the "x" register data is being shifted out of the concatenated peripheral device shift registers, a new set of commands to read the "y" register in each peripheral device is being shifted in. During the next CS_b cycle 505, the "y" register data is shifted out of the cascaded peripheral device SDO pins, returning to the controller CIPO input. As the "y" register data is being shifted out of the concatenated peripheral device shift registers, a new set of commands is being shifted in to read the "z" register data in each peripheral device, which data is returned in the next CS_b cycle 507 as unnamed commands "-" are shifted in. FIG. 6 depicts an isolated read of the "x" register in CS_b cycles 601 and 603 from the second peripheral device (device 2) located in a daisy-chain of n=3 devices. The "-" indicates the command/data on COPI and CIPO are commands data that are don't cares. The example shown in FIG. 6 illustrates the clock-cycle penalty associated with the need to fill the shift registers of all devices in order to access a single device.

It would be desirable to avoid the pin penalty associated with the large number of pins on the host controller when there are a large number of peripheral devices to be addressed and the clock-cycle overhead present in a daisy-chained approach.

SUMMARY OF EMBODIMENTS OF THE INVENTION

In one embodiment a method for assigning addresses includes sending respective unique addresses from a controller to N devices that are operating in a daisy-chain mode of operation in which data is serially shifted through the N devices, where N is an integer greater than one. The method further includes causing each of the N devices to change from operating in the daisy-chain mode of operation to operating in one of two post enumeration modes of operation in which the N devices are individually addressable according to their respective unique addresses.

In another embodiment a device including a communication interface includes a data input terminal, a first data output terminal, and a second data output terminal. A shift register is coupled to the data input terminal. Switch logic is responsive to a daisy-chain mode of operation to couple an output of the shift register to the first data output terminal and the switch logic is responsive to a first parallel mode of operation to couple the data input terminal to the first data output terminal bypassing the shift register and to couple the output of the shift register to the second data output terminal. The switch logic is responsive to a second parallel mode of operation to couple the output of the shift register to the second data output terminal.

In another embodiment a communication system includes N devices coupled to a controller, N being an integer greater than 1. The N devices are serially coupled in a chain in a daisy-chain mode of operation. While in the daisy-chain mode of operation a first of the N devices is coupled to receive data from the controller and the remainder of the N devices are coupled to receive data from a previous device in the chain. A last of the N devices is coupled to supply data to the controller. The N devices are responsive to respective enumerate commands received in the daisy-chain mode of operation to become uniquely identified by a respective one of N addresses sent with the enumerate commands, a respective one of the N addresses being associated with a respective one of the enumerate commands. N−1 devices of the N devices are configured to switch from operating in the daisy-chain mode of operation to operating in a first parallel mode of operation responsive to a first mode command. The N−1 devices are individually addressable according to their respective addresses in the first parallel mode of operation. A last one of the N devices is configured to switch from operating in the daisy-chain mode of operation to operating in a second parallel mode of operation in which the last one of the N devices is individually addressable according to one of the N addresses that was assigned to the last one of the N devices.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

If the peripheral devices can be "enumerated" with unique device addresses, then host communications can be directed to individual peripheral devices by the inclusion of a "peripheral device address" in the host-issued commands. That adds potential "overhead" in that the device address must be included in the host commands to the peripheral device, but that also allows communication with multiple peripheral devices using a single chip select signal, and without requiring excessive overhead when addressing individual devices in isolation. However, assigning "permanent" addresses for devices during device manufacturing is neither cost-effective nor practical. Embodiments herein address how to efficiently and effectively enumerate the peripheral devices dynamically in the field while using a minimal number of peripheral device pins and requiring no additional pins on the host controller.

Several approaches for dynamic enumeration of unique peripheral addresses are described herein. A first approach uses host controller enumeration of serial-bus peripheral devices using a daisy-chain arrangement. The first approach requires only one additional pin on the peripheral device and requires no additional signaling or additional pins on the host controller to accomplish enumeration.

Figure 7:
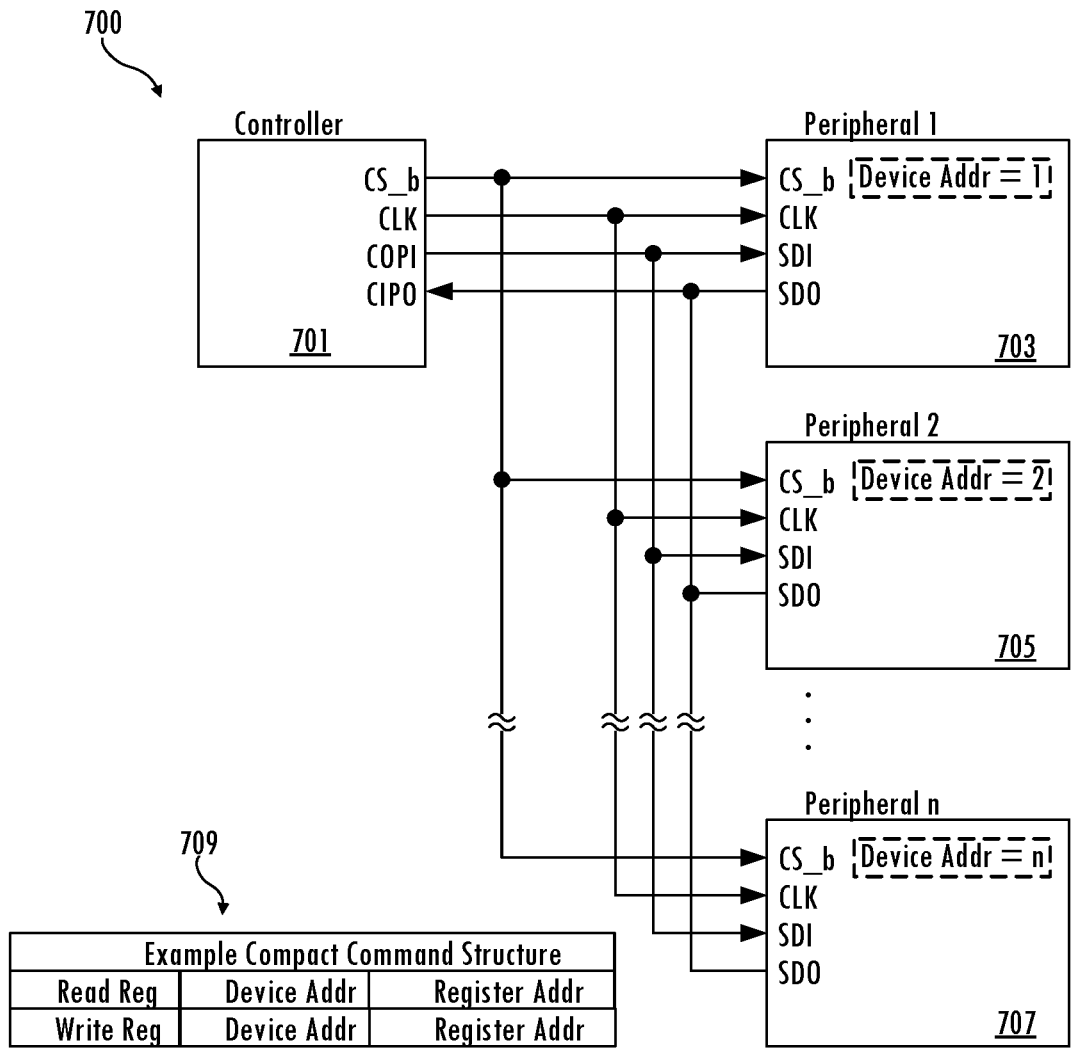
FIG. 7 illustrates an embodiment of a serial communication arrangement with enumerated peripheral devices.

FIG. 7 provides a block diagram of system 700 illustrating connection of a serial bus controller 701 to multiple "enumerated" peripheral devices 703, 705, and 707. In this case, each peripheral device 703, 705, 707 has been enumerated with (i.e. assigned) a "unique" internal device "address" that is different than that of any other connected peripheral device. The controller CS_b, CLK, COPI, and CIPO lines are connected to all peripheral devices in parallel. The controller 701 addresses individual peripheral devices by specifying a peripheral address in each command sequence, thus eliminating the need for individual chip select signals for each peripheral. Another unique address, not assigned to any of the individual peripheral devices, may be used as a "broadcast" peripheral device address. The host can write the same address in all peripheral devices by performing a write command to the broadcast address (broadcast read commands are not allowed, as multiple peripheral devices cannot return data simultaneously). Each peripheral device responds only to commands that specify an address that matches that of the device (or commands that specify the broadcast address, if used).

FIG. 7 also depicts an example "compact command structure" 709 wherein the command word (e.g. Read command or Write command) embeds both the device address and the register address to be read from/written to within the addressed device. If the device address and register address do not fit in the command word structure (e.g., due to a large number enumerated devices, a large register set, and/or a smaller command word size), the same functions can be implemented using commands that are followed by subsequent data words.

Figure 8:
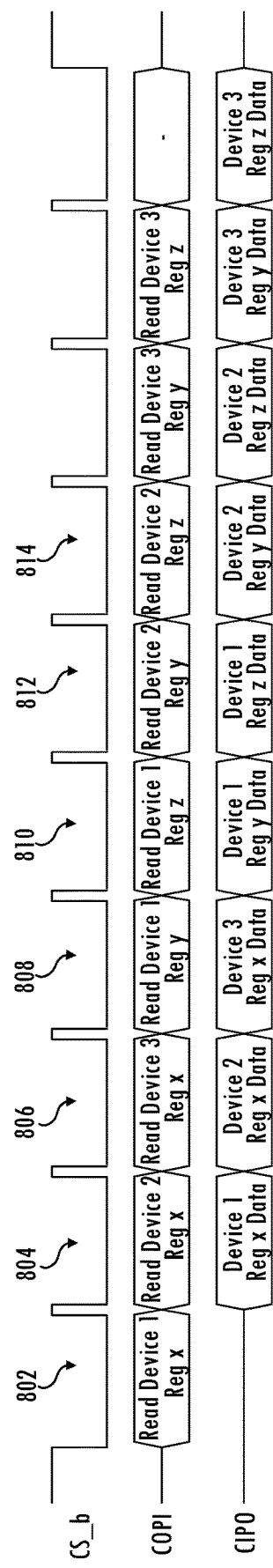
FIG. 8 illustrates multiple read cycles using enumerated peripheral devices.

FIG. 8 depicts three reads from three enumerated peripheral devices. In this case, the peripheral devices can be accessed by the controller in any order desired. During the first CS_b cycle 802, the command read device 1, register x is placed on the COPI signal line. During the CS_b cycle 804, the command read device 2, register x is placed on the COPI signal line while at the same time device 1 register x data is placed on the CIPO signal line. During the CS_b cycle 806, the command read device 3, register x is placed on the COPI signal line, while device 2 register x data is placed on the COPI signal line. During the CS_b cycle 808, the command read device 1, register y is placed on the COPI signal line while at the same time device 3 register x data is placed on the CIPO signal line. Note that in the illustrated embodiment, during the CS-b cycle 808 the address in the command selects device 1 at the same time device 3 is putting data on the CIPO signal line. During the CS_b cycle 810, the command read device 1, register z is placed on the COPI signal line while at the same time device 1 register y data is placed on the CIPO signal line. During the CS_b cycle 812, the command read device 2, register y is placed on the COPI signal line while at the same time device 1 register z data is placed on the CIPO signal line. During the CS_b cycle 814, the command read device 2, register z is placed on the COPI signal line while at the same time device 2 register z data is placed on the CIPO signal line. The reads continue reading various registers from various peripheral devices.

Peripheral device "enumeration", i.e., the process of assigning unique addresses to the peripheral devices, can be accomplished in a number of different ways. For example, the peripheral device address could be "permanently assigned" into on-chip read only memory (ROM) or one time programmable (OTP) memory during the device production process. However, that approach presents a number of logistical problems (e.g. part serialization/marking, part tracking from device manufacturer to board assembly) that render it impractical as compared to "dynamically assigned" methods. The peripheral device could include multiple logic input pins used to specify the device address during operation. These pins would be pulled high or low by wiring and/or external components (e.g., pull-up and pull-down resistors, shift registers, memory components) at the circuit board level. That approach has the disadvantage of requiring multiple pins, with associated external circuitry and/or components, the number of which depend on the number of peripherals that need to be addressed.

"Additional signaling" between the controller and each peripheral (signals other than the primary serial data output, serial data input, clock, and chip select) could be used as a "surrogate chip selects" to select individual peripheral devices for enumeration. Enumeration can then be coordinated by the host controller using a pre-defined protocol involving a combination of the primary serial communication signals and additional signaling. The practicality of this approach depends on the availability of such additional signaling in the application, and on the ability of the host controller to implement the pre-defined enumeration protocol using these additional signals.

New approaches for "dynamic" peripheral device enumeration are described herein. These new approaches allow dynamic peripheral device enumeration with a single chip select from the controller, and no additional controller pins or signaling other than the primary serial communication signals (serial data output, serial data input, clock, and chip select). Both approaches described herein require only one pin on the peripheral device for enumeration. In the first approach the controller enumerates the peripheral serial-bus peripheral devices arranged in a daisy-chain using only the standard serial communication bus signaling. The second approach described herein automatically enumerates serial-bus peripheral devices using analog detection and requires no action on the part of the controller to accomplish the enumeration of peripheral devices.

Figure 9:
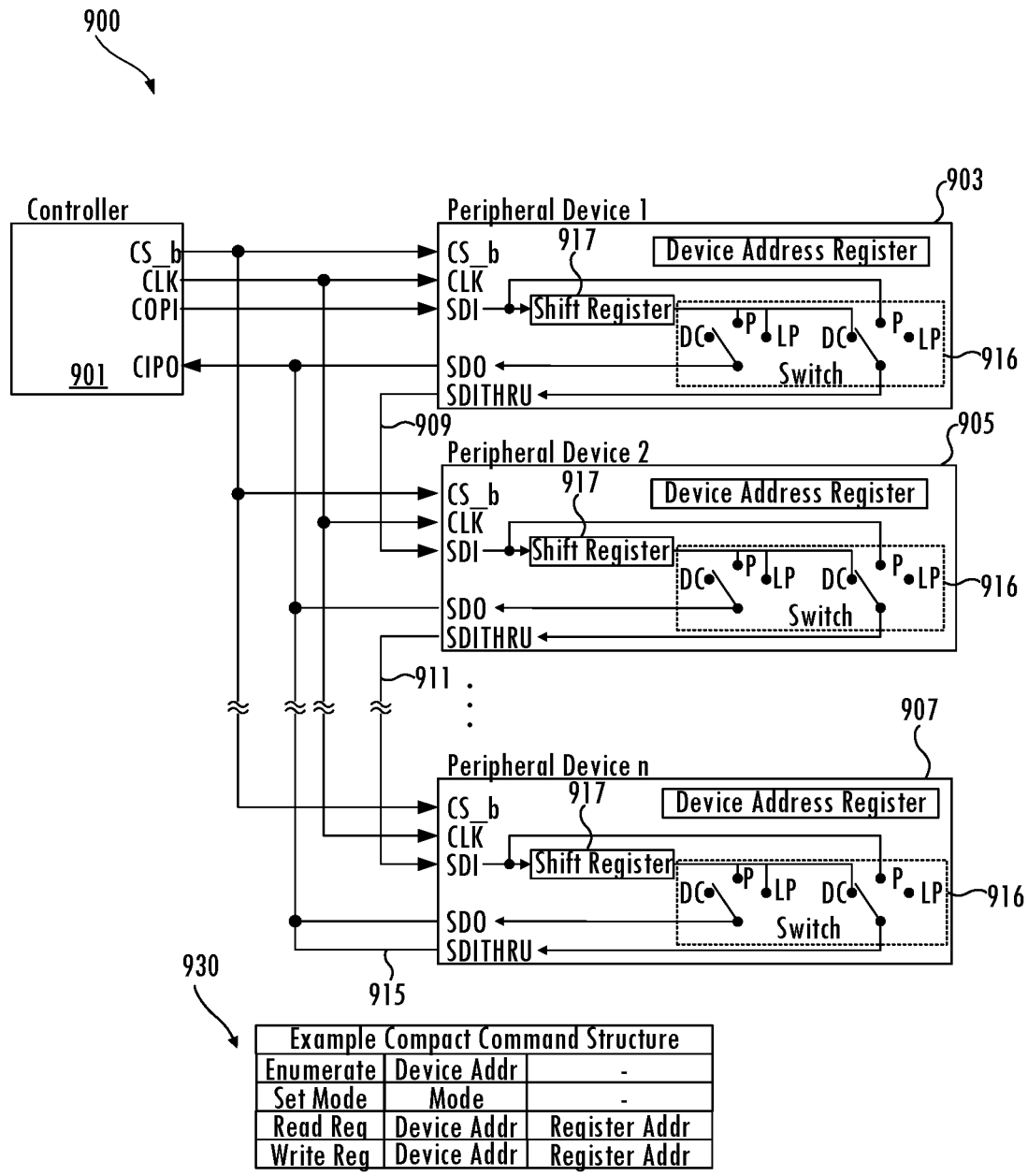
FIG. 9 illustrates an embodiment of controller enumeration using a daisy-chain arrangement.

FIG. 9 illustrates a system 900 and shows the connections between the controller 901 and the peripheral devices 903, 905, and 907 for a first embodiment. In an embodiment system 900 is automotive traction inverter in which the controller 901 individually addresses six isolated gate drivers as peripheral devices on a communication bus. The controller and the peripheral devices utilize the traditional serial communication pins, CS_b, CLK, SDI, and SDO, which were described earlier, as well as another output pin, the "Shift Data In Through" (SDITHRU) pin. The controller CS_b output is connected to the CS_b inputs of all peripheral devices in parallel. The controller CLK output is connected to the CLK inputs of all peripheral devices in parallel. The controller COPI serial data output is connected only to the SDI input of peripheral device 1 (903). The SDITHRU output 909 from peripheral device 1 (903) is connected to the SDI input of peripheral device 2 (905). The SDITHRU output 911 from peripheral device 2 (905) is connected to the SDI input of peripheral 3, and this continues until the SDITHRU output of the second last peripheral device (Peripheral device n–1) is connected to the SDI input of the last peripheral device in the sequence (Peripheral device n). Assuming three peripheral devices, the SDITHRU output 911 of peripheral device 905 is connected to the SDI input of peripheral device n (907). The SDO outputs from all peripheral devices are connected together, along with the SDITHRU output 915 from peripheral device n (907), and returned to the controller 901 CIPO serial data input.

The peripheral devices have an internal switching mechanism 916, denoted "Switch" in FIG. 9, which configures the device to operate in one of three distinct modes: initial "Daisy-Chain" mode (switch position "DC"), post-enumeration a first parallel mode "Parallel" (switch position "P"), or a second parallel mode "Last Parallel" (switch position "LP"). The switch mechanism 916 configures the routing of the SDI input and the SDO and SDITHRU outputs as described herein.

Figure 4:
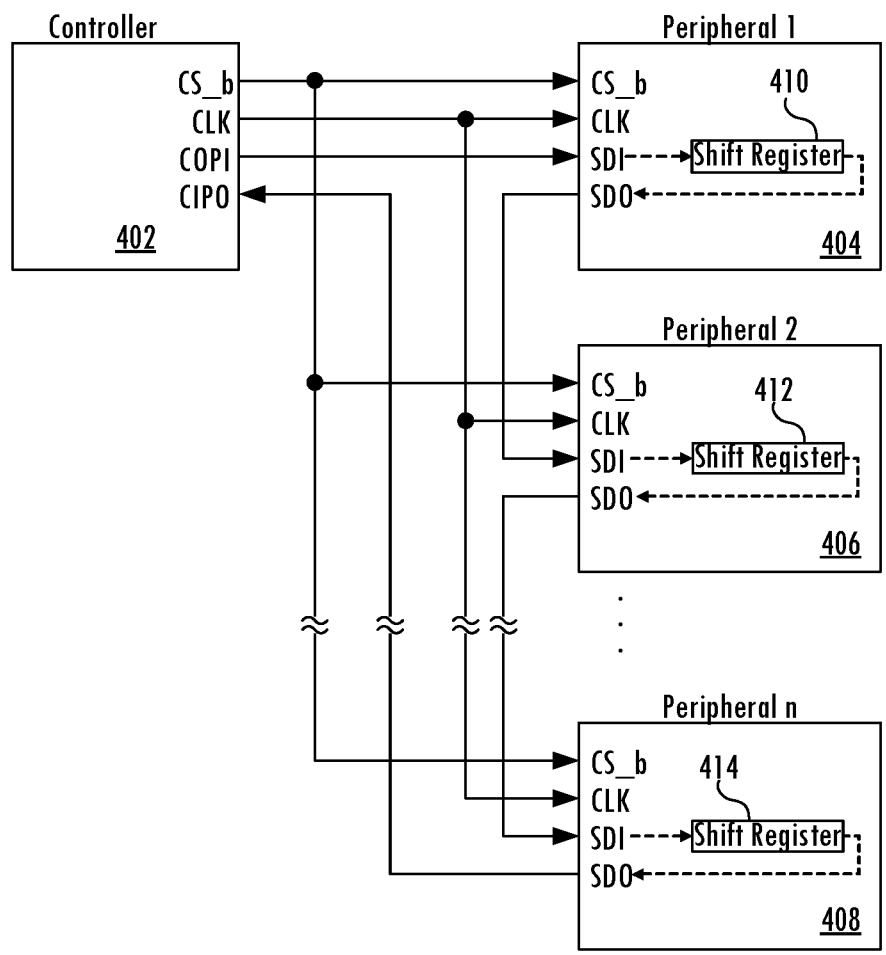
FIG. 4 illustrates a traditional daisy-chain arrangement.
Figure 5:
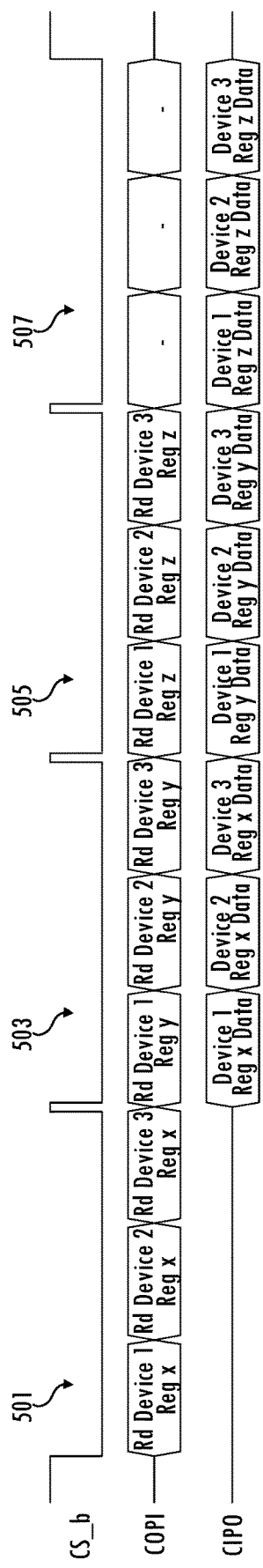
FIG. 5 illustrates multiple read cycles using daisy-chain arrangement
Figure 6:
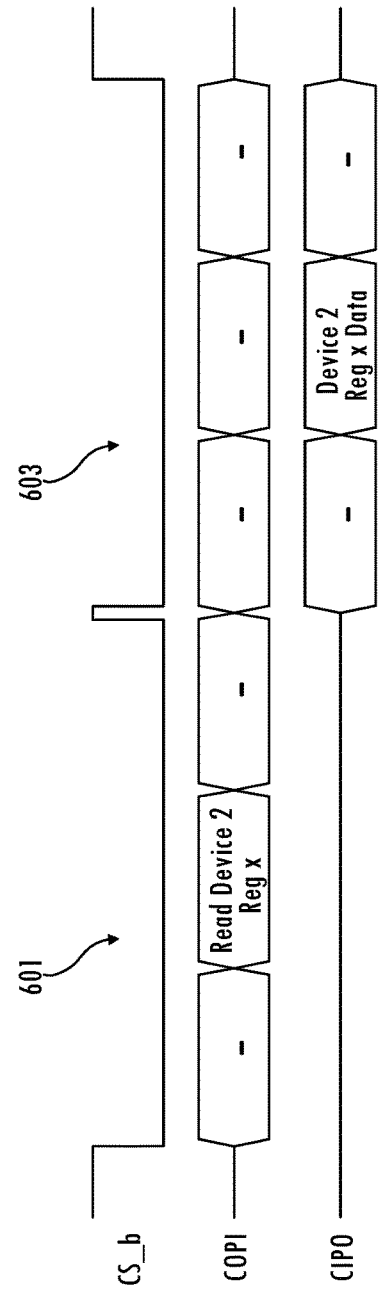
FIG. 6 illustrates a single read cycle using a daisy-chain arrangement.

In daisy-chain mode, the SDI input is routed only to the input of the internal serial data shift register 917. The output of the shift register 917 is routed to the SDITHRU output, and the SDO output is disabled and set to a high-impedance (Hi-Z) state as indicated by the SDO output being connected to the DC position, which is not connected. The daisy-chain mode allows the controller to address the peripheral devices as a traditional daisy-chain arrangement, as depicted in FIG. 5. To the host controller 901, this configuration is the same as the traditional daisy-chain arrangement of FIG. 4.

The peripheral devices default to the daisy-chain mode of operation at power-on and after being reset, and daisy-chain mode is used during initial controller-initiated enumeration of the peripheral devices. When operating in daisy-chain mode, peripheral devices will respond to commands according to the address/command in the shift register 917 when the CS_b signal is deasserted. In an alternative implementation, daisy-chain mode peripheral devices respond only to a pre-determined "broadcast" address. In either case, in daisy-chain mode the host controller addresses individual peripheral devices by nature of their position in the chain as described earlier. FIG. 9 also illustrates an example command structure 930, which is described in more detail after additional enumeration and operational details are described.

Figure 10:
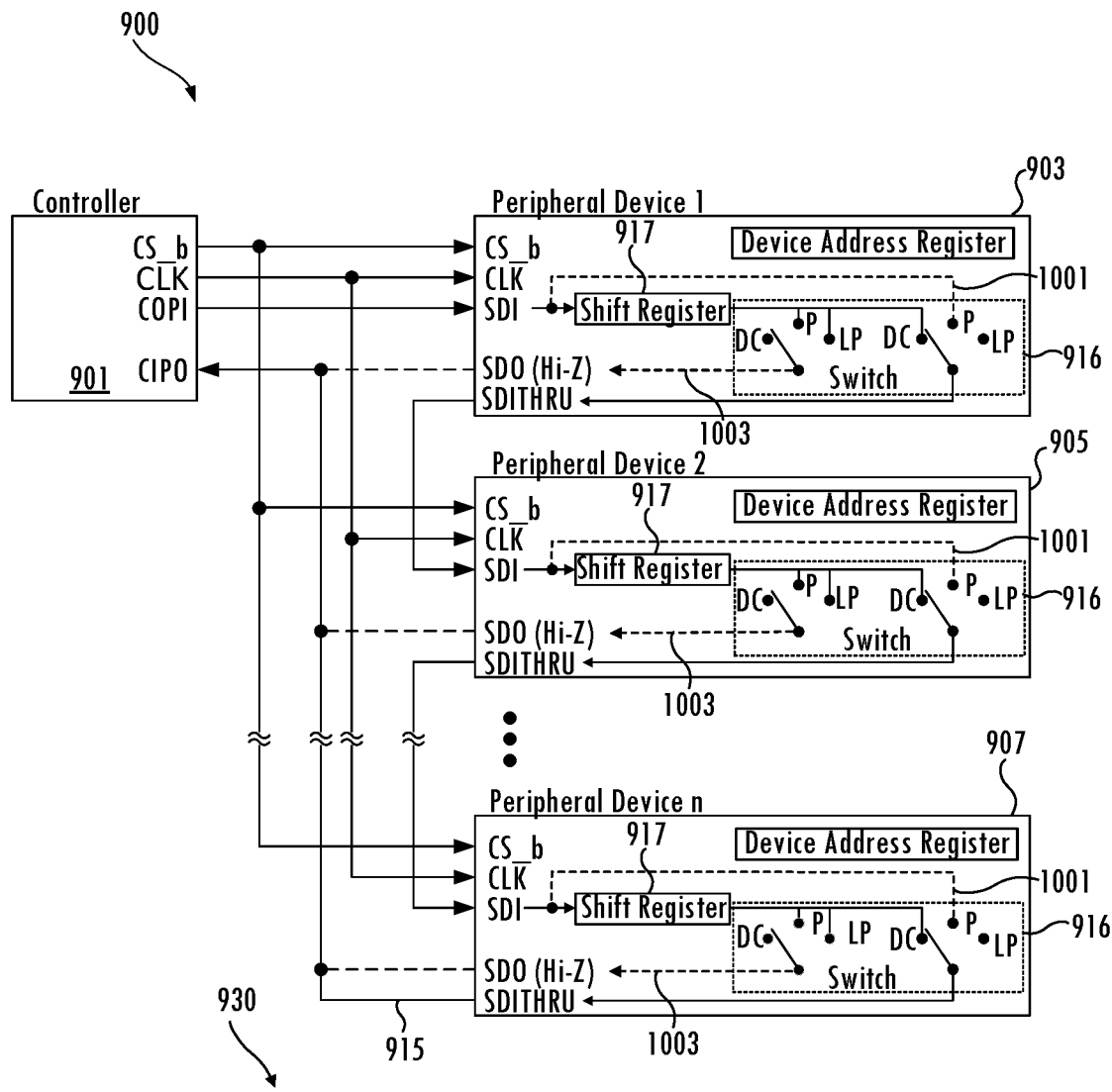
FIG. 10 illustrates an embodiment of peripheral device operation in daisy-chain mode with a switch position DC.

FIG. 10 shows that in the daisy-chain mode of operation the SDI input is routed only to the shift register 917 as indicated by the dotted line 1001 between SDI and the P switch position. The dotted line 1003 between the switch mechanism 916 and the SDO pin indicates the SDO pin is at high impedance (Hi-Z). The dotted lines indicate no connection to the P switch positions in switch 916 in the daisy-chain mode of operation.

Figure 11:
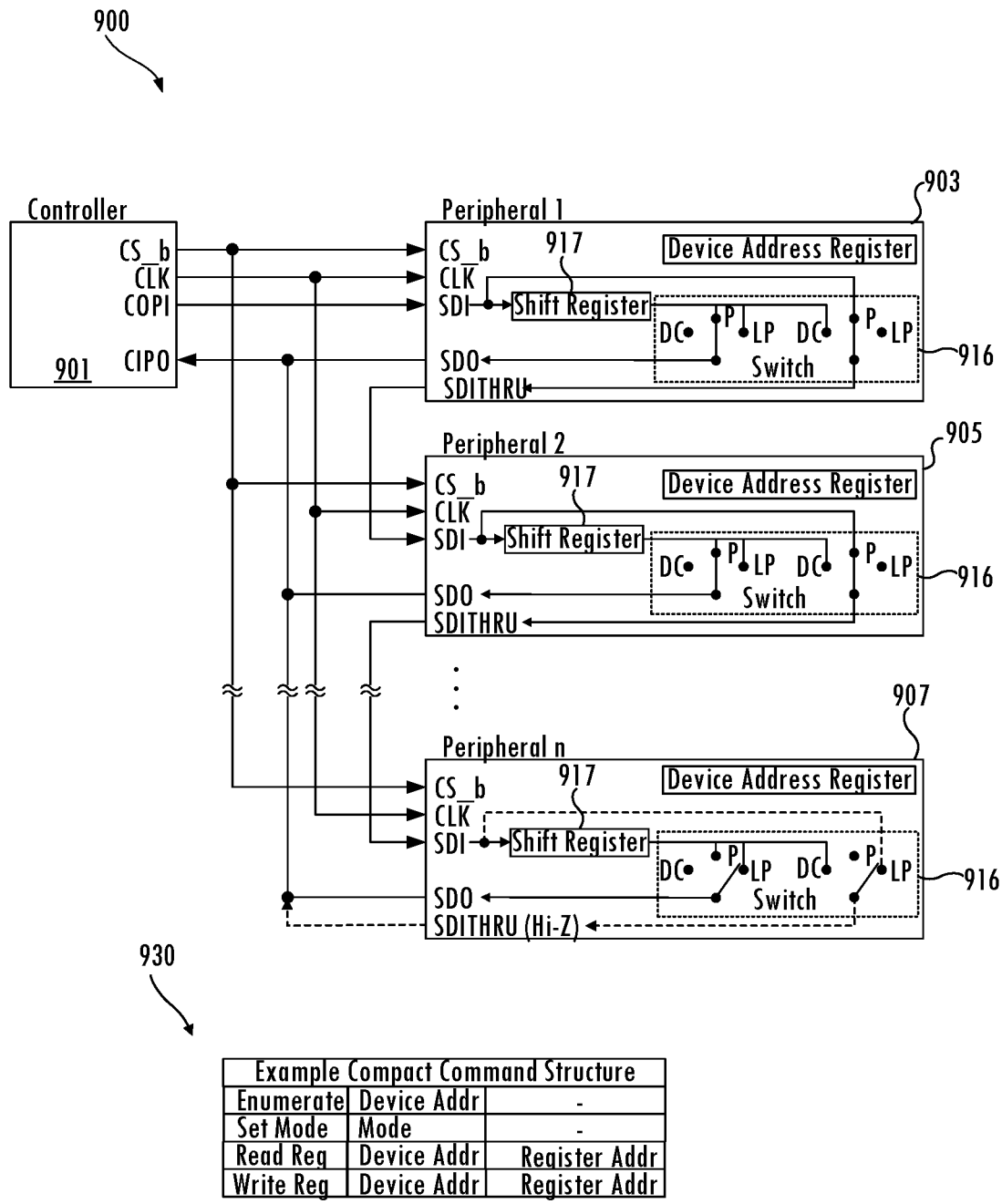
FIG. 11 illustrates an embodiment of peripheral device operation in parallel Mode with switch positions P, LP.

FIG. 11 illustrates the switch connections for parallel mode operation. The first parallel mode, shown as "P" in switch 916 is for the first N–1 devices. In the first parallel mode, the SDI input is routed to the input of the internal serial data shift register 917 and the output of the shift register is also routed to the SDO output. In the first parallel mode, the SDI input is also routed "directly" to the SDITHRU output. The SDITHRU output is connected to the SDI input of the peripheral device that follows in the chain. For example, SDITHRU output of peripheral device 1 (903) is connected to the SDI input of peripheral device 2 (905). That effectively connects the controller serial data output (COPI) to the SDI inputs of all peripheral devices in parallel, provided that the accumulated propagation delays from SDI to SDITHRU do not result in violation of the setup and hold time requirements for SDI with respect to CLK or CS_b.

In the second parallel ("Last Parallel") mode, switch position LP, as shown for peripheral device n (907), the SDI input is routed only to the input of the internal serial data shift register 917. The output of the shift register is routed to the SDO output, and the SDITHRU output is disabled and set to a high-impedance (Hi-Z) state. The switch positions and thus the connections for the various inputs and outputs are controlled according to whether the device is operating in the daisy-chain mode of operation, the first parallel mode (P), or the second parallel mode (LP).

Post enumeration, peripheral devices 1 through n–1 are configured for the first parallel mode of operation, while device n (the last device in the chain) is configured for Last Parallel mode. That effectively results in the arrangement depicted in FIG. 11. This post-enumeration parallel mode arrangement allows the controller to individually address the peripheral devices in the same way as the enumerated device arrangement shown in FIG. 7.

The controller based enumeration requires that the controller "instruct" an addressed peripheral to enumerate (adopt the address provided by the controller), or to change operating mode (to DC, P or LP). In an embodiment these instructions are implemented using standard Write commands to registers defined for enumeration purposes and for setting the operating mode (DC, P, LP), or using designated "Enumerate" and "Set Mode" commands defined for these purposes. In an embodiment the example "Compact Command Structure" 930 shown in FIGS. 9-11 assumes the use of dedicated Enumerate and Set Mode commands. The Enumerate Command includes a Device Address to be assigned to the receiving peripheral device. The Set Mode command includes the mode (e.g., parallel mode (P) or last parallel mode(LP)) to which the peripheral device should switch. The Read Register and Write Register commands include the unique device address and the register address to which data is to be written or read.

The host controller initiates enumeration with the peripheral devices operating in daisy-chain mode as in FIG. 10. In daisy-chain mode the host addresses individual peripheral devices by nature of their position in the chain. The controller sends a unique Enumerate command (or command sequence) to each device in the chain. The Enumerate command specifies the unique device address to be assigned to that device. In an embodiment, the shift register is 8 bits long and the enumerate command includes, e.g., four bits to identify the command and 4 bits to identify the unique address. Of course, longer shift registers can used, e.g., 16 bits and/or a command sequence with a command followed by a data word is used in some embodiments. After enumeration has been completed, the controller sends the commands (or command sequences) to switch the operating modes of the peripheral devices for post-enumeration parallel operation. Once in parallel operation, the peripheral devices are addressed as enumerated devices, each with a unique address as shown, e.g., in FIG. 7

Figure 12:
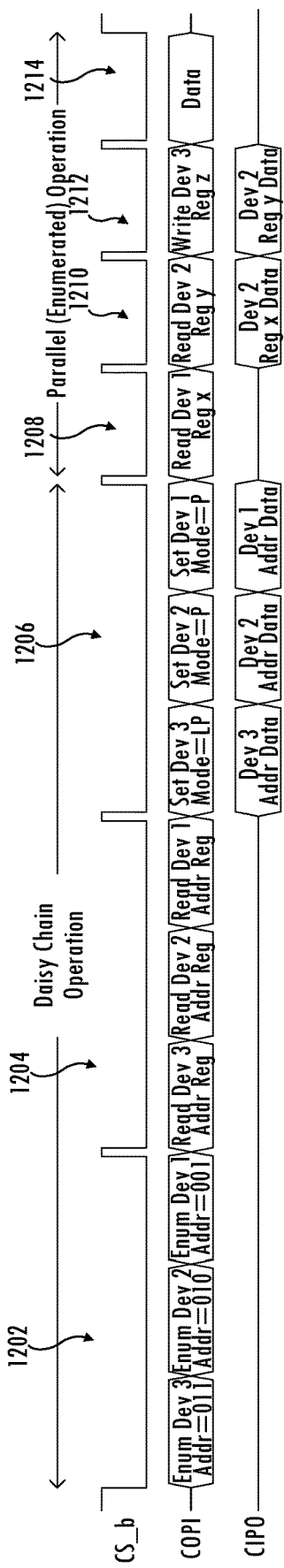
FIG. 12 illustrates an embodiment of enumeration with address verification.

An enumeration command sequence for a 3-device chain, including optional read-back of the assigned addresses for verification prior to switching to Post-enumeration Parallel operation, is illustrated in FIG. 12. During the first command sequence while CS-b is asserted at 1202 in single bus operation, the controller transmits the initial enumeration commands (e.g. "Enum Device 3 Address=011") in traditional daisy-chain format with each device receiving a unique address as part of the enumeration command the device receives.

In addition to the unique device addresses assigned to each peripheral device to allow individual device access, embodiments use a designated "broadcast" address to allow the controller to write to all peripheral devices in parallel. Each peripheral device accepts write commands addressed to the devices own unique address, and write commands addressed to the broadcast address. Peripheral devices only respond to Read commands issued to their own unique addresses.

In the embodiment illustrated by FIG. 12, the peripheral devices store their assigned device address in a controller-readable register to allow optional read-back verification of the enumeration. Following enumeration, the controller issues a daisy-chain Read command sequence (e.g. "Read Device 3 Addr Reg") during 1204 to read back the device address from each peripheral device to verify the enumeration. The controller sends the command sequence instructing the peripheral devices to change operating modes at 1206 as the peripheral devices return the requested enumeration data on CIPO. Note that the controller sets peripheral devices 1 through n–1 to Parallel (P) operating mode, while peripheral device n is set to Last Parallel (LP) mode. Beginning with the next chip select activation at 1208, the peripheral devices are configured in parallel mode, and are addressed by the controller as enumerated devices. The controller is then free to efficiently address individual peripheral devices in any sequence as illustrated at 1208, 1210, 1212, and 1214. Note that the peripheral devices decode the commands sent even if they are not addressed to know for example that during the CS-B assertion at 1214, the data on COPI follows a write command and should not be interpreted as a command. In addition, since the SDO terminals from the N–1 devices operating in parallel mode are connected together along with the SDITHRU terminal of the last peripheral device operating in last parallel mode, the peripheral devices keep the SDO terminals (and SDITHRU for the last peripheral device) at high impedance unless a peripheral device receives a read command with its unique address, in which case the addressed peripheral device drives its SDO (or SDITHRU for the last peripheral) terminal with the requested data.

Figure 13:
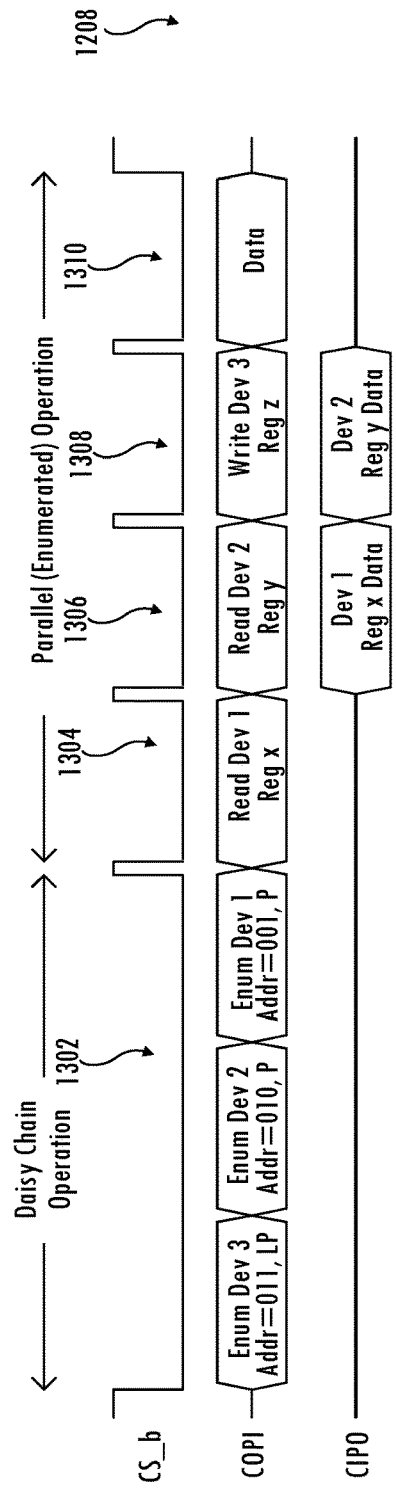
FIG. 13 illustrates an embodiment of an abbreviated enumeration command with automatic mode switching.

In applications where the optional "read-back verification of enumeration" is not required, the Enumeration and Set Mode commands can be combined. In this case, the Enumerate command or command sequence includes both the device address and the post-enumeration operating mode to be assigned to the receiving peripheral device, and the mode would be changed automatically at the end of the enumeration command cycle. FIG. 13 illustrates enumeration of a 3-device chain using this abbreviated enumeration command with automatic mode switching. In the bus operation 1302 with chip select asserted, the combined enumeration commands are sent serially to the devices in the daisy-chain. During the bus operation 1304 and 1306 the controller sends read commands. The devices respond during 1306 and 1308 with the requested data. In bus operations 1308 and 1310 the controller sends a write command with data.

Figure 1:
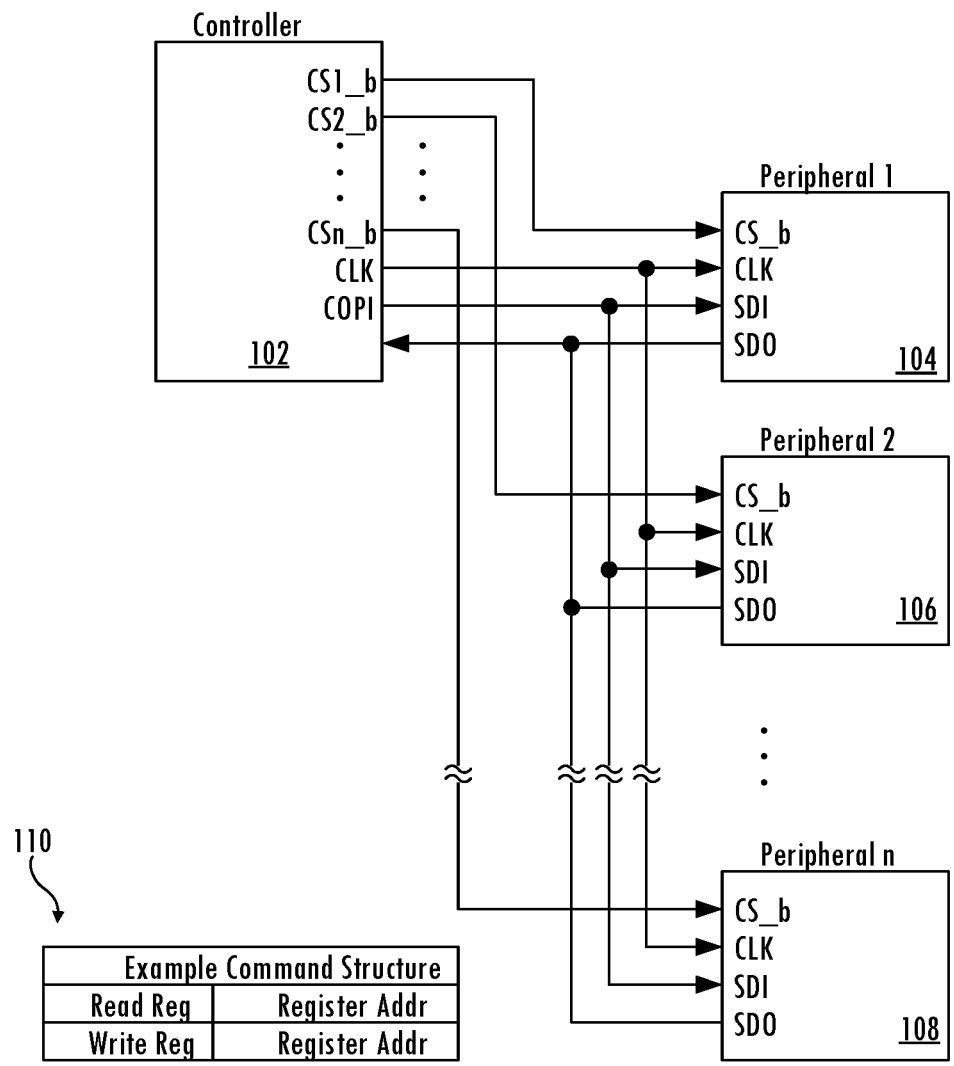
FIG. 1 illustrates traditional serial communication using individual peripheral chip selects.
Figure 2:
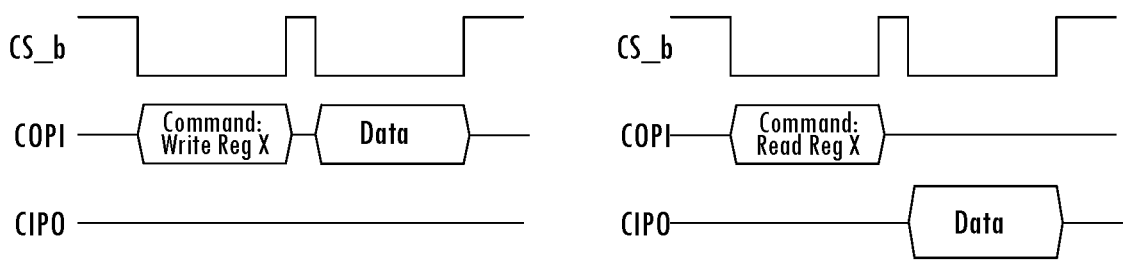
FIG. 2 illustrates a single write cycle and a single read cycle using individual peripheral chip selects.
Figure 3:
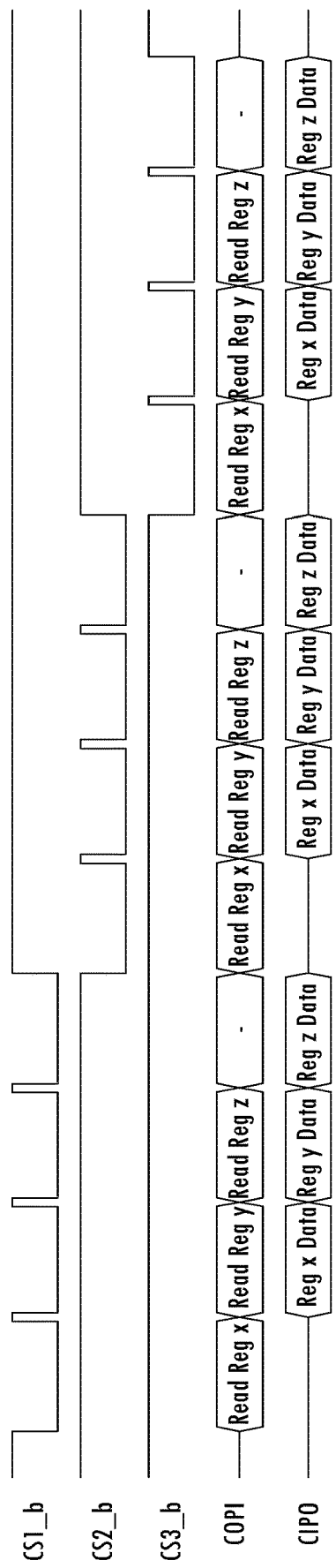
FIG. 3 illustrates multiple read cycles using individual peripheral chip selects.
Figure 14:
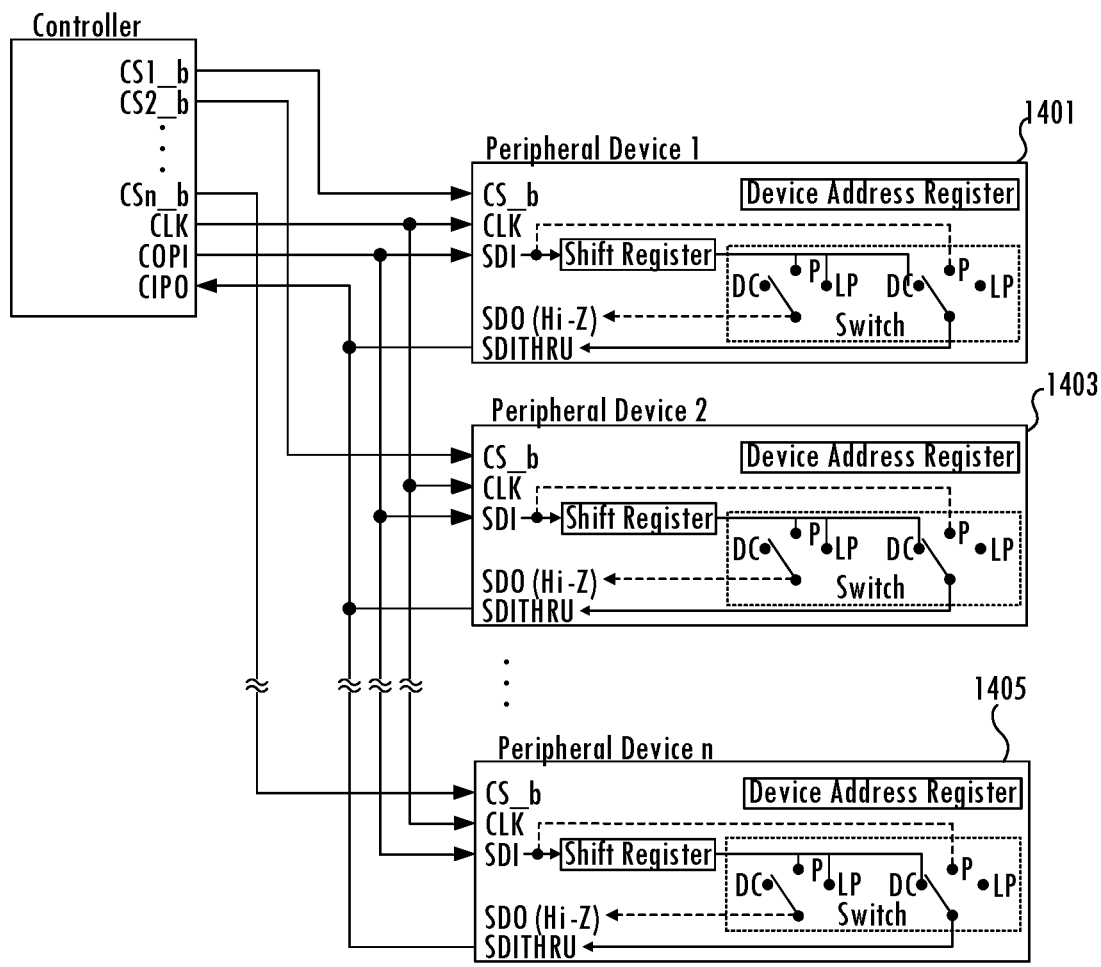
FIG. 14 illustrates an embodiment that uses a peripheral DC mode for switch settings to implement a traditional multi-chip-select approach.

Peripheral devices described in FIGS. 9-11, operating in daisy-chain (DC) mode can also be connected for use in traditional multi-chip-select arrangements as illustrated in FIG. 14. The peripheral devices 1401, 1403, 1405 default to operation in daisy-chain mode responsive to a power on or other reset condition, so no specific initialization is required for operation in the arrangement depicted in FIG. 14. When operating in daisy-chain mode, peripheral devices will respond to commands to any address. In an alternative implementation, daisy-chain mode peripheral devices respond only to a pre-determined "broadcast" address. In either case, when connected as illustrated in FIG. 14, the host controller addresses individual peripheral devices using individual chip select signals as described in the discussion of FIG. 1.

Figure 15:
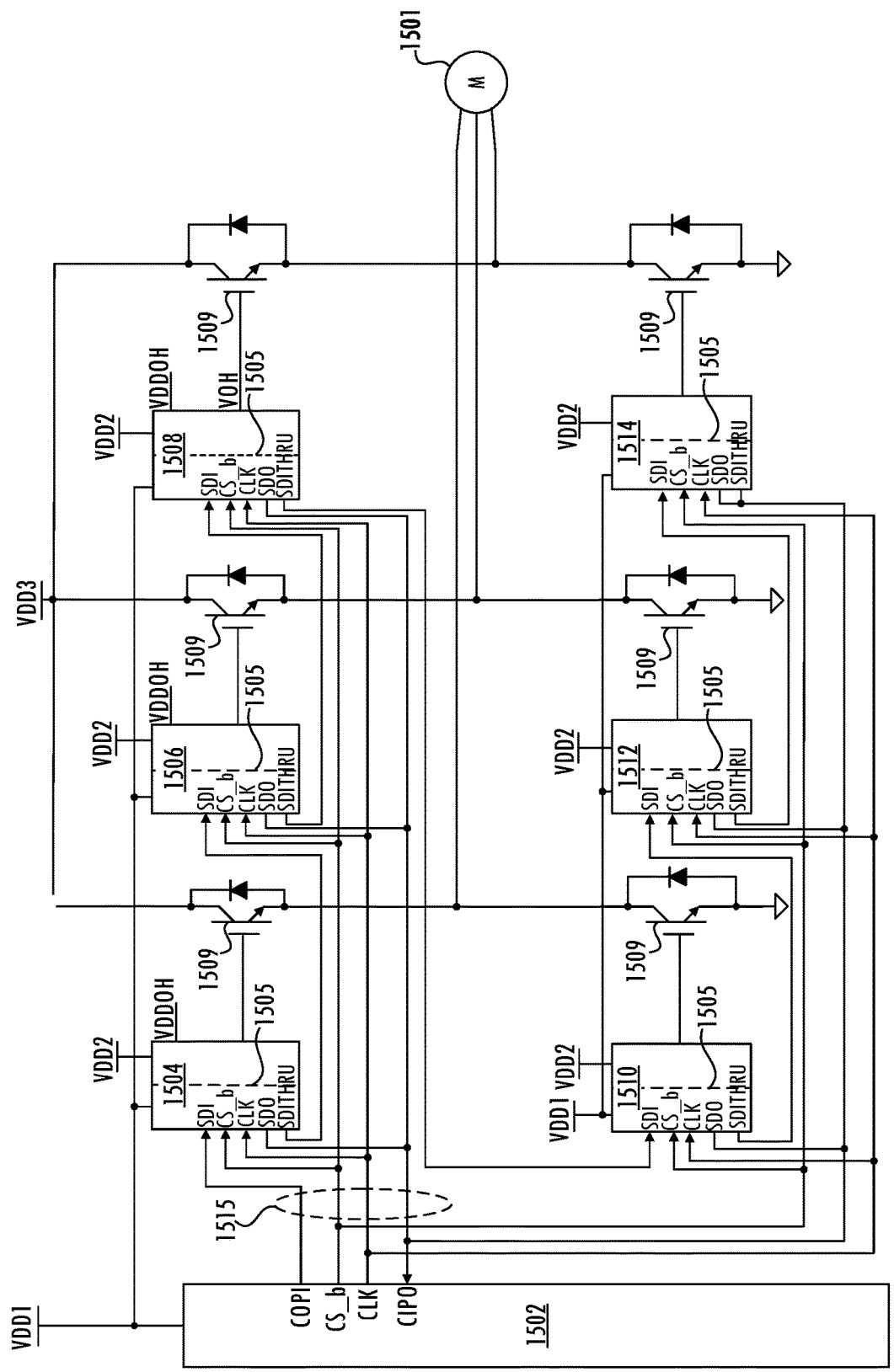
FIG. 15 illustrates a traction inverter in which the auto-enumeration described herein is utilized.

FIG. 15 illustrates an exemplary embodiment for a traction inverter that controls a three phase high voltage motor 1501. The controller 1502, which may be a microprocessor, microcontroller, or other suitable processing device, operates in a first domain (i.e., VDD1, e.g., 5 Volts (V)) and provides one or more control signals for a high-power load system operating in a second domain (i.e., VDD3, e.g., 800 V). The controller communicates with the peripheral devices, here gate drivers 1504, 1506, 1508, 1510, 1512, and 1514 over communication bus 1515. Note that the SDI-THRU signal lines between gate drivers is also part of the communication bus 1515. The communication bus 1515 can be used by the controller to send, e.g., configuration information to the gate drivers and receive status information from the gate drivers. Other control signals supplied by the controller to the gate drivers, e.g., pulse wave modulated (PWM) signals to control the motor are omitted from FIG. 15 for ease of illustration. Each of the gate drivers includes an isolation barrier 1505 and an isolation communication channel (not separately shown) allowing control information to be communicated from the low voltage side of the gate driver to the high voltage side of the gate driver. The communication bus 1515 is as described, e.g., in FIGS. 9-13, and includes a signal line to supply serial data in (SDI) of gate driver 1504 from the COPI output of the controller 1502. The controller 1502 further distributes the clock signal (CLK) and the chip select signal (CS_b) on the bus to the gate drivers in parallel. The SDITHRU output from each gate driver is supplied to the SDI input of the next gate driver in the chain. The SDO outputs of the gate drivers are connected to each other and the CIPO input of the controller 1502. The SDITHRU output of the last gate driver in the chain 1514 is also connected to CIPO. The gate drivers supply gate control signals to the transistors 1509 to control the motor 1501.

Another embodiment utilizes dynamic auto-enumeration of unique peripheral addresses and requires only one additional pin on each peripheral device and requires no additional signaling or additional pins on the host controller to accomplish enumeration. In an embodiment of the auto-enumeration approach, the additional peripheral device pin required for enumeration on the peripheral device is used only during device initial configuration at power-on (or other reset condition), and is available for other use after configuration. In the auto-enumeration approach, each peripheral device automatically enumerates based on the sensed value of an external resistor connected to a designated pin on the device. The auto-enumeration approach requires no action from the host controller.

Figure 16:
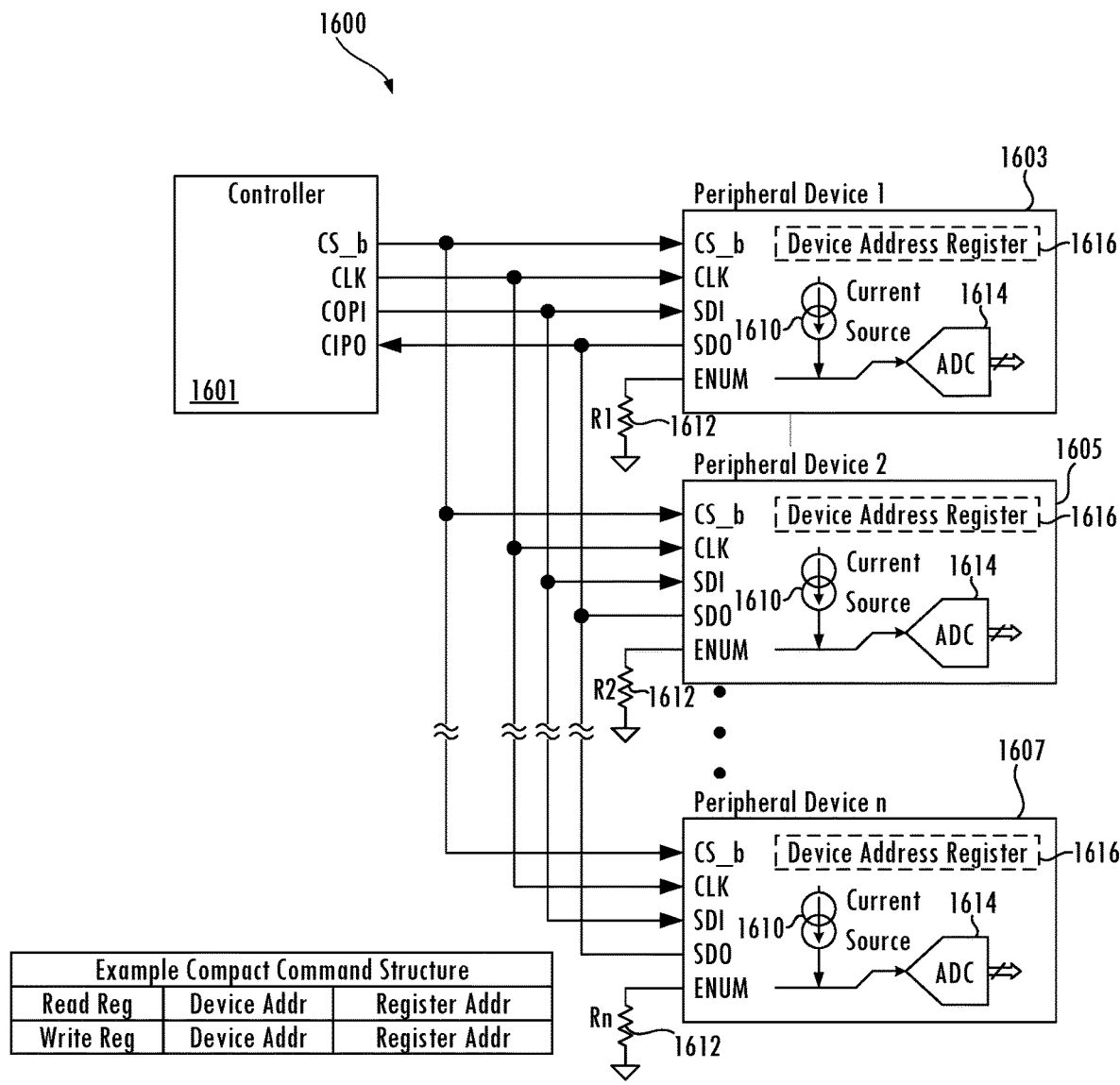
FIG. 16 illustrates an embodiment for auto-enumeration using analog detection.

FIG. 16 illustrates a system 1600 in which enumeration is based on a sensed value of an external component such as a resistor. In an embodiment an external resistor is connected to the designated enumeration pin (also referred to herein as terminal), ENUM, of each peripheral device. A different external resistor value is used for each peripheral device. The peripheral devices responds to a power on condition, or to a device reset that occurs at power on or during operation, by automatically detecting a voltage on the EMUM pin that is determined by the value of the connected resistor and the device assigns its own peripheral device address according to a pre-determined resistor-value-to-device-address mapping. The resistor-value to-device-address mapping is determined by the voltage on the ENUM pin. Thus, to map the address based on the external resistor value, each peripheral device 1603, 1605, 1607 provides a small bias current from current source 1610 to the ENUM pin, detects the voltage developed on the external resistor 1612, and converts that voltage to a digital value using an analog-to-digital converter 1614. The digital value is used as the basis for the device address on the bus, either directly or through a lookup table or other conversion mechanism from the digital value to the address. The resistance value of each external resistor differs to identify a different peripheral address. The current sources in the devices provide nominally the same current so the difference in voltage is determined by the resistance value. Peripheral devices that include an analog-to-digital converter (ADC) for other purposes may use the existing ADC for the enumeration process. If an ADC is not required for other reasons, embodiments use, e.g., a dedicated low-cost flash converter for the detection process. The digital value of the voltage is mapped to an address as described further herein and stored in the device address register 1616. The physical pin used for the enumeration process may be re-used for other purposes after the enumeration has been completed.

The resolution required for the ADC used for resistor detection depends on the number of peripheral device addresses that must be resolved, the ADC input voltage range (semiconductor process utilized for implementation), the bias current level and current generator tolerance, and the tolerance of the external resistors.

Figure 17:
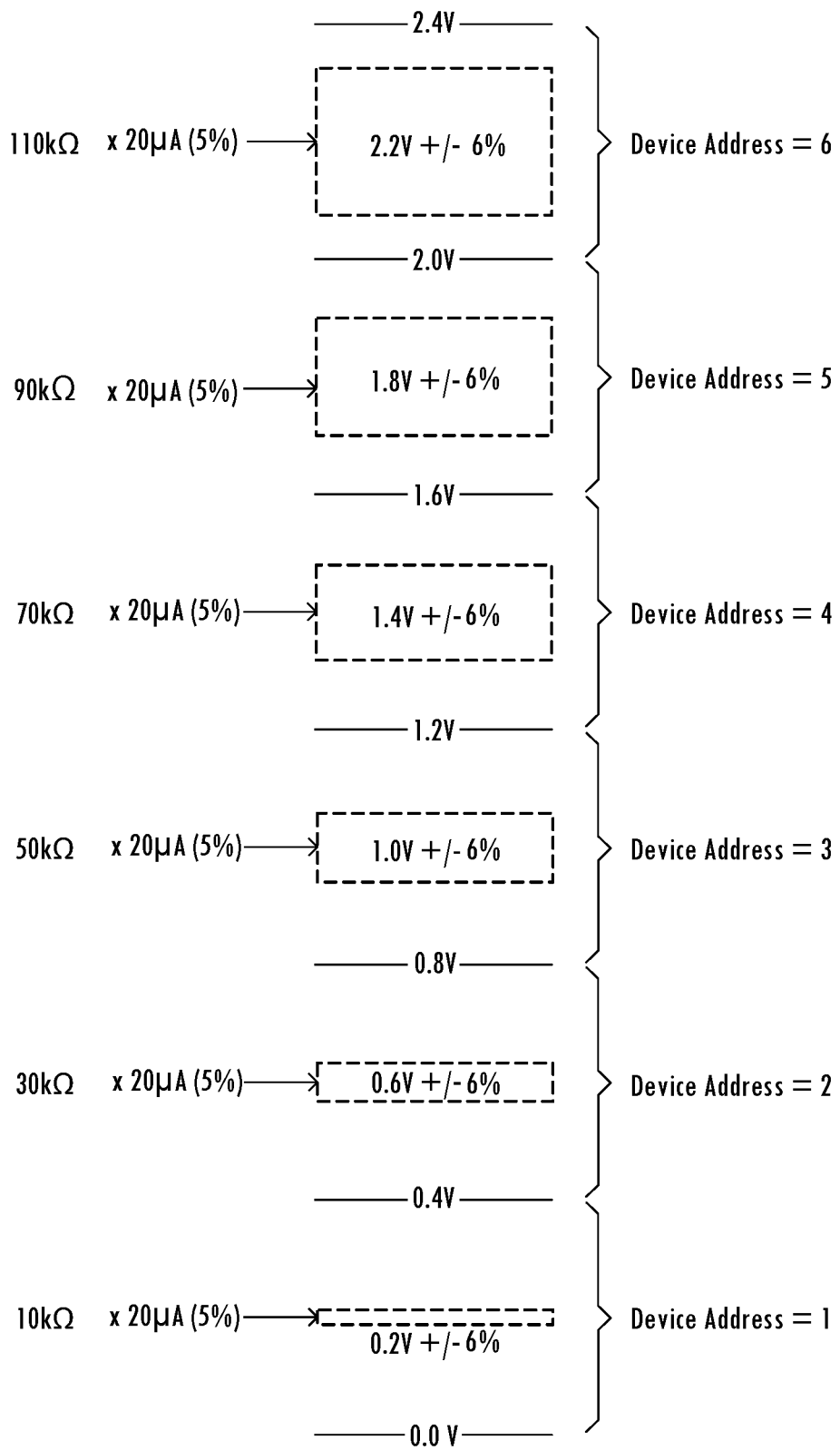
FIG. 17 illustrates example voltage detection ranges for auto-enumeration.

In an embodiment, an automotive traction inverter application requires that a controller be able to individually address six isolated gate drivers as peripheral devices on a Serial Peripheral Interface (SPI) serial communication bus. The peripheral devices include an on-chip ADC with a full-scale input voltage range of 2.4 V, and a 20 µA current source to bias the external enumeration resistors. In an embodiment the ADC input voltage range is divided into 6 equal ranges for address assignment as depicted in FIG. 17. Selecting resistor values of 10kΩ, 30kΩ, 50kΩ, 70kΩ, 90kΩ, and 110kΩ for enumeration would position the resulting "nominal" V=I×R voltages in the center of the assigned ranges. If the current generator tolerance is +/−5% and the external resistors have 1% tolerance, the resulting voltages would have a worst-case range of +/−6% as illustrated in FIG. 17. Note that the resulting voltage variance increases linearly with the nominal resistor value, resulting in less margin for the higher voltage address "bins". In this example, an 8-bit ADC with 2.4V full-scale input range would have an LSB value of ~9.4 mV which is more than adequate to resolve the resulting voltages with the illustrated margins without ambiguity. If additional margin was desired or required, the address enumeration voltage ranges can be spaced in a non-linear fashion to distribute the margin evenly.

After the enumeration is completed, the physical pin used for enumeration is available to be used for another function, provided that the other function is not required during power on initialization or reset. Ideally, the alternate use of the pin would be an output from the peripheral device, connected to high-impedance inputs on other devices that would not interfere with detection of the external resistor value during enumeration.

Figure 18:
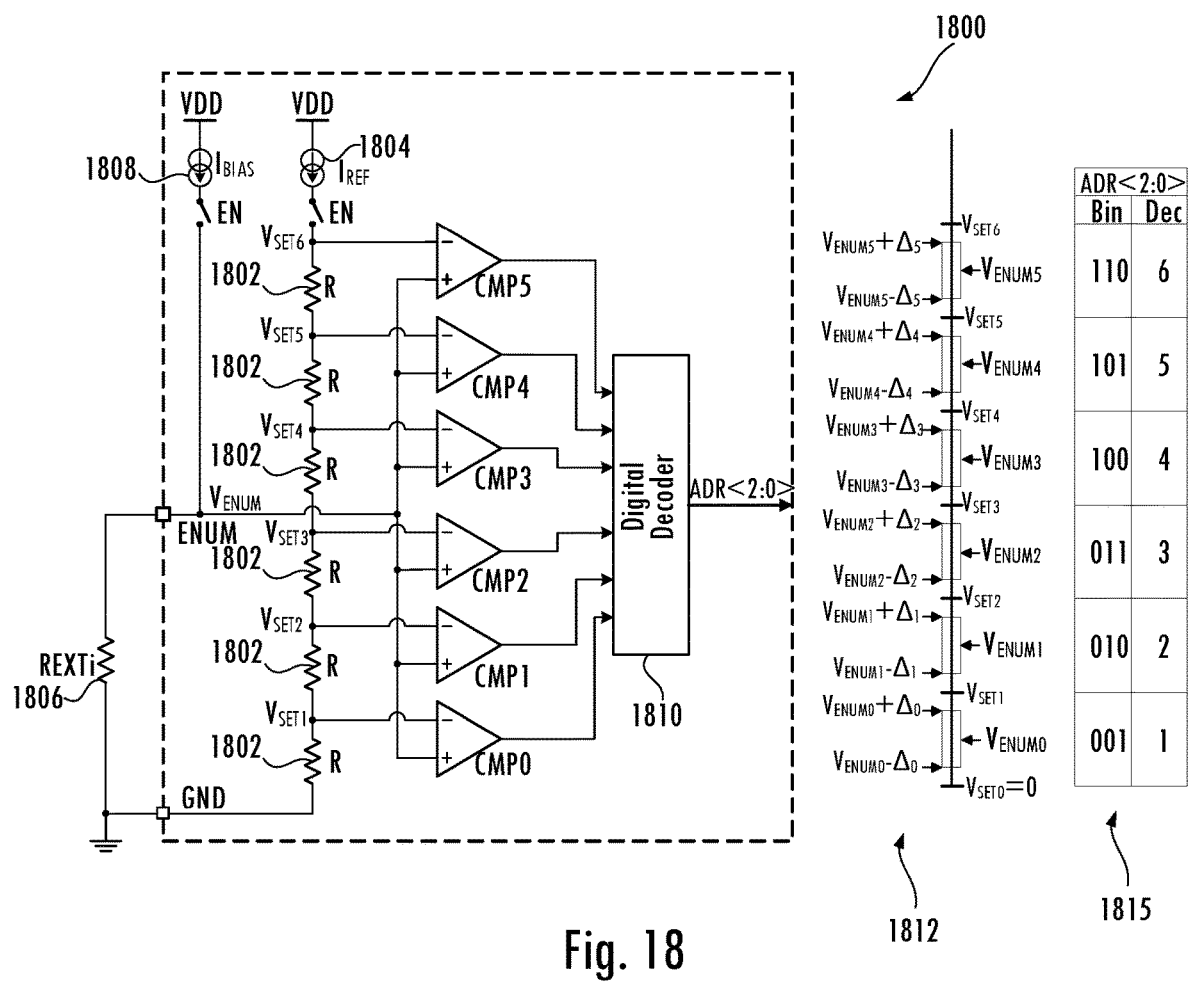
FIG. 18 illustrates an example 6-level flash converter.

If a suitable ADC is not included for other purposes in the peripheral device, embodiments include a simple, low-cost flash converter 1800 for the auto-enumeration function. For a system requiring the enumeration of 6 SPI peripheral devices, an example 6-level flash converter design is illustrated in FIG. 18. The internal reference voltages $V_{SETi}=I_{REF}$ (i·R), i=0 . . . 6 are generated with 6 equal resistors R 1802 and an internal reference current, $I_{REF}$ 1804 such that the voltages developed on each resistor are constant over temperature and process. Each of the six peripheral devices uses an external resistor $I_{REXTi}$ 1806 and the internal bias current $I_{BIAS}$ from current source 1808 to generate the appropriate voltage on the ENUM pin $V_{ENUMi}$, according to the equation:

$$V_{ENUMi} = I_{BIAS} R_{EXTi} = \frac{V_{SET(i-1)} + V_{SET(i)}}{2}, i = 1 \ldots 6$$

The six comparators COMP0 through COMP5 and the digital decoder 1810 that follows the comparators generate a unique address for each peripheral device. The determination of ENUM voltage is shown at 1812. Random inaccuracies in $R_{EXTi}$, $I_{REF}$, the 6 internal resistors 1802 and random offset in the comparators lead to inaccuracies in each $V_{ENUMi}$ ($V_{ENUMi} \pm \Delta_i$) and $V_{SETi}$. These inaccuracies can be tolerated with enough voltage separation between the 6 internal setpoints.

Peripherals capable of sensing a voltage on an external resistor for enumeration can also be used in traditional "individual chip-select" arrangements by assigning the same address (e.g. same external resistor value) to each peripheral device.

Figure 19:
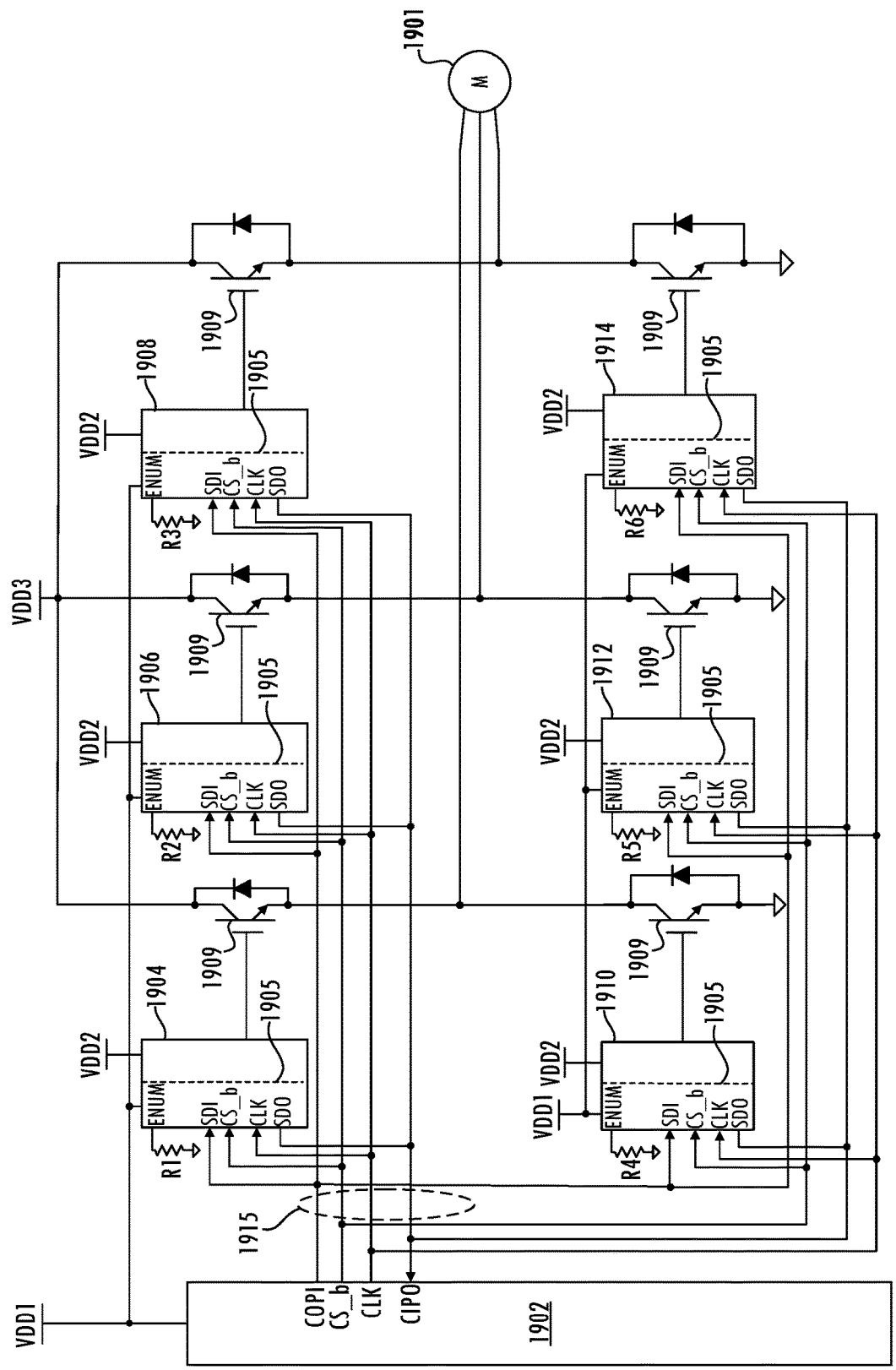
FIG. 19 illustrates a traction inverter in which the auto-enumeration described herein is utilized.

FIG. 19 illustrates an embodiment for a traction inverter that controls a three phase high voltage motor 1901 and the enumeration is performed using the auto-enumeration approach described in relation to FIGS. 16-18 using resistors R1 to R6. FIG. 19 illustrates an exemplary embodiment for a traction inverter that controls a three phase high voltage motor 1901. The controller 1902, which may be a microprocessor, microcontroller, or other suitable processing device, operates in a first domain (i.e., VDD1, e.g., 5 Volts (V)) and provides one or more control signals for a high-power load system operating in a second domain (i.e., VDD3, e.g., 800 V). The controller communicates with the peripheral devices, here gate drivers 1904, 1906, 1908, 1910, 1912, and 1914 over communication bus 1915. Other control signals supplied by the controller to the gate drivers, e.g., pulse wave modulated (PWM) signals to control the motor are omitted from FIG. 19 for ease of illustration. Each of the gate drivers includes an isolation barrier 1905 and an isolation communication channel (not separately shown) allowing control information to be communicated from the low voltage side of the gate driver to the high voltage side of the gate driver. The communication bus 1915 is described, e.g., in FIG. 7, and includes a signal line to supply serial data in (SDI) on all the gate drivers in parallel from the COPI output of the controller 1902. The controller 1902 further distributes the clock signal (CLK) and the chip select signal (CS_b) on the bus to the gate drivers in parallel. The SDO outputs of the gate drivers are connected to each other and the CIPO input of the controller 1902. The gate drivers supply gate control signals to the transistors 1909 to control the motor 1901.

Thus, approaches for enumeration of devices on a communication bus has been described. The description of the invention set forth herein is illustrative and is not intended to limit the scope of the invention as set forth in the following claims. Variations and modifications of the embodiments disclosed herein, may be made based on the description set forth herein, without departing from the scope of the invention as set forth in the following claims.

What is claimed is:

1. A method for assigning addresses comprising:
   sending respective unique addresses from a controller to N devices that are operating in a daisy-chain mode of operation in which data is serially shifted through the N devices, where N is an integer greater than one;
   causing each of the N devices to change from operating in the daisy-chain mode of operation to operating in one of two post enumeration modes of operation in which the N devices are individually addressable according to their respective unique addresses;
   causing N−1 devices of the N devices to change from operating in the daisy-chain mode of operation to operating in a first parallel mode of operation, the first parallel mode of operation being one of the post enumeration modes of operation; and
   causing a last one of the N devices to change from operating in the daisy-chain mode of operation to operating in a second parallel mode of operation, the second parallel mode of operation being another of the post enumeration modes of operation.

2. The method as recited in claim 1 further comprising:
   causing a first data output of each of the N−1 devices to be at high impedance in the daisy-chain mode of operation while chip select is asserted; and
   causing a second data output of each of the N−1 devices to drive data responsive to chip select being asserted in the first parallel mode of operation.

3. The method as recited in claim 1 further comprising:
   sending a first command from the controller to one of the N−1 devices using one of the unique addresses while the N−1 devices are operating in the first parallel mode of operation; and
   sending a second command from the controller to second one of the N−1 devices using a second one of the unique addresses while the N−1 devices are operating in the first parallel mode of operation.

4. The method as recited in claim 1 further comprising:
   sending respective enumerate commands from the controller to each of the N devices to assign the unique addresses.

5. The method as recited in claim 1 further comprising:
   sending a first mode command during a first bus operation from the controller to each of the N−1 devices to cause the N−1 devices to change from operating in the daisy-chain mode of operation to operating in the first parallel mode of operation, the first bus operation being indicated by a chip select being supplied to the N devices being asserted; and
   sending a second mode command to the last of the N devices during the first bus operation to cause the last of the N devices to change from operating in the daisy-chain mode of operation to operating in the second parallel mode of operation.

6. The method as recited in claim 1 further comprising:
   sending a first combined enumerate command during a first bus operation to each of the N−1 devices to provide each of the N−1 devices with its unique address and to cause the N−1 devices to change from operating in the daisy-chain mode of operation to operating in the first parallel mode of operation; and
   sending another combined enumerate command during the first bus operation from the controller to the last of the N devices to provide the last of the N devices with its unique address and to cause the last of the N devices to change from operating in the daisy-chain mode of operation to operating in the second parallel mode of operation.

7. The method as recited in claim 1 further comprising the N devices entering the daisy-chain mode of operation responsive to a reset.

8. The method as recited in claim 1 further comprising:
   sending data from an output of a shift register in one of the N−1 devices during a bus operation to a first data output terminal while operating in the daisy-chain mode of operation with chip select being asserted; and
   sending data from a data input coupled to an input of the shift register while operating in the first parallel mode of operation to the first data output terminal while operating in the first parallel mode of operation.

9. The method as recited in claim 8 further comprising:
   selecting the one of the N−1 devices using one of the respective unique addresses; and
   sending data from the output of the shift register to a second data output terminal of the one of the N−1 devices during the first parallel mode of operation, the second data output terminal, being coupled to the controller.

10. The method as recited in claim 1 further comprising:
    coupling an output of a shift register in the last of the N devices to a first data output in the daisy-chain mode of operation; and
    causing a second data output of the last of the N devices to be at high impedance while operating in the daisy-chain mode of operation.

11. The method as recited in claim 10 further comprising:
    causing the last of the N devices to couple the output of the shift register to the second data output in the second parallel mode of operation; and
    causing the first data output to be at high impedance while operating in the second parallel mode of operation.

12. A device including a communication interface comprising:
    a data input terminal;
    a first data output terminal;
    a second data output terminal;
    a shift register coupled to the data input terminal; and
    switch logic responsive to a daisy-chain mode of operation to couple an output of the shift register to the first data output terminal and the switch logic being responsive to a first parallel mode of operation to couple the data input terminal to the first data output terminal bypassing the shift register and to couple the output of the shift register to the second data output terminal, and the switch logic is responsive to a second parallel mode of operation to couple the output of the shift register to the second data output terminal.

13. The device as recited in claim 12 wherein in the second parallel mode of operation the first data output terminal is kept at high impedance.

14. The device as recited in claim 12 wherein in the daisy-chain mode of operation the second data output terminal is kept at high impedance.

15. The device as recited in claim 12 wherein responsive to an enumerate command the device stores an address associated with the enumerate command.

16. The device as recited in claim 15 wherein the device is responsive to a received command that includes the address, while operating in the first parallel mode of operation or the second parallel mode of operation, to supply data requested by the command from the second data output terminal.

17. The device as recited in claim 12 wherein responsive to a first mode command the device switches from the daisy-chain mode of operation to the first parallel mode of operation.

18. The device as recited in claim 17 wherein responsive to a second mode command the communication interface switches to the second parallel mode of operation.

19. The device as recited in claim 12 wherein the communication interface is responsive to a reset to enter the daisy-chain mode of operation.

20. A communication system comprising:
   N devices coupled to a controller, N being an integer greater than 1;
   the N devices being serially coupled in a chain in a daisy-chain mode of operation, and while in the daisy-chain mode of operation a first of the N devices is coupled to receive data from the controller and a remainder of the N devices are coupled to receive data from a previous device in the chain, and a last of the N devices is coupled to supply data to the controller;
   the N devices being responsive to respective enumerate commands received in the daisy-chain mode of operation to become uniquely identified by a respective one of N addresses sent with the enumerate commands, a respective one of the N addresses being associated with a respective one of the enumerate commands;
   N−1 devices of the N devices being configured to switch from operating in the daisy-chain mode of operation to operating in a first parallel mode of operation responsive to a first mode command, the N−1 devices being individually addressable in the first parallel mode of operation according to their respective addresses; and
   a last one of the N devices being configured to switch from operating in the daisy-chain mode of operation to operating in a second parallel mode of operation in which the last one of the N devices is individually addressable according to one of the N addresses that was assigned to the last one of the N devices.

21. The communication system as recited in claim 20 wherein the N devices are responsive to a reset to enter the daisy-chain mode of operation.

22. The communication system as recited in claim 20 wherein each of the N devices comprises:
   a data input terminal;
   a first data output terminal;
   a second data output terminal;
   a shift register coupled to the data input terminal; and
   switch logic responsive to a daisy-chain mode of operation to couple an output of the shift register to the first data output terminal and the switch logic being responsive to a first parallel mode of operation to couple the data input terminal to the first data output terminal bypassing the shift register and to couple the output of the shift register to the second data output terminal, and the switch logic is responsive to second parallel mode of operation to couple the output of the shift register to the second data output terminal.

23. The communication system as recited in claim 22 further comprising:
   a controller output signal line coupling the data input terminal of a first device of the N devices to the controller;
   a controller input signal line coupling the controller to the second data output terminal of each of the N−1 devices, the first data output terminal of the last one of the N devices being coupled to the controller input signal line;
   a clock signal line coupled to each of the N devices; and
   a chip select signal line supplied by the controller to each of the N devices and is asserted to indicate data on the controller output signal line is valid.

24. The communication system as recited in claim 20 wherein N−1 of the respective enumerate commands supplied to respective ones of the N−1 devices incorporate a mode change command to cause the N−1 devices to change from operating in the daisy-chain mode of operation to operating in the first parallel mode of operation.

25. The communication system as recited in claim 20 wherein one of the respective enumerate commands supplied to the last of the N devices incorporates a second mode change command to cause the last of the N devices to change from operating in the daisy-chain mode of operation to operating in the second parallel mode of operation.

* * * * *